Nov. 18, 1941.  H. C. PERSONS  2,263,471
THEFT SIGNAL
Filed Aug. 21, 1940
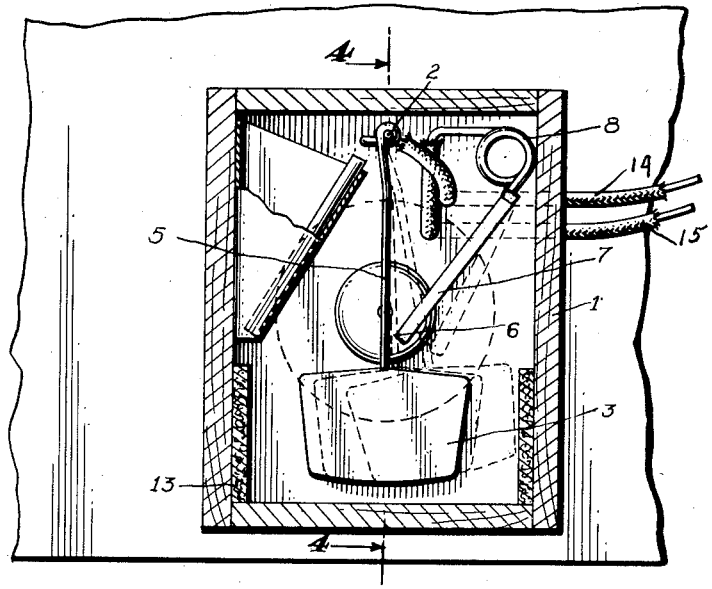
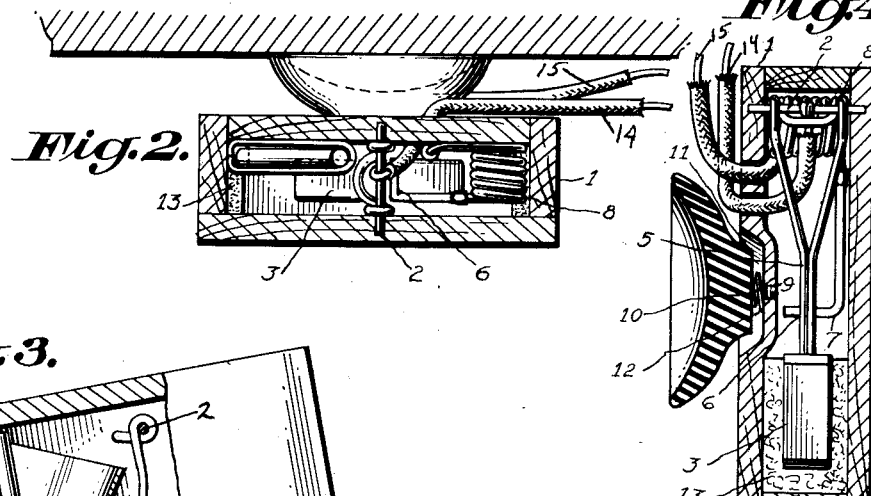
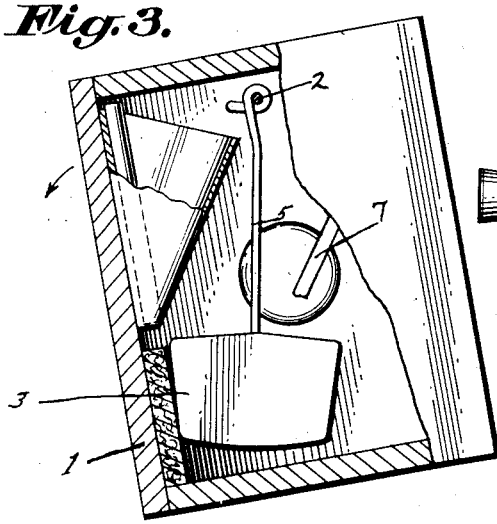
Inventor.
Henry C. Persons Patented Nov. 18, 1941

2,263,471

UNITED STATES PATENT OFFICE 2,263,471

THEFT SIGNAL

Henry C. Persons, Spartanburg, S. C.

Application August 21, 1940, Serial No. 353,465

5 Claims. (Cl. 200—52)

My invention relates to improvements in electrical circuit makers and breakers employing pendulum and stationary contact elements and particularly to devices used on automobiles to cause the emission of signal when the automobile is caused to vibrate by persons tampering therewith.

In order to render such devices inoperative when not needed for duty, an electrical switch interposed into the working circuit has heretofore been necessary which required space and special wiring about the automobile to serve such switch.

One object of my invention is to provide a device which, for convenience to the operator thereof, may be attached to the instrument panel of his automobile, same being comprised of a self-contained, switch-acting, electrical circuit-maker and breaker that is free of wear and noise when not in use for duty. A simple manual turn and release of the device, clockwise or counter-clockwise, serves as a controlling factor to adjust its functional sensitiveness and, or, serves to move the stationary contact out of position for active function, thence arresting the pendulum contact.

Referring to devices employing a loop contact, one finds that the regulation of such a device is controlled by the gravity of the housing. The loop contact having been adjusted during construction to conform to said gravituous position encircles the pendulum, a structure designed to perform continuous duty wherein the retention of adjustment is dependent upon non-interference of the gravity by a tension spring attached thereto that is employed to prevent side sway or rattle of the free swinging housing.

Referring to applicant's device, it will be observed that applicant's device has been designed, within itself, to be controlled by a single movement by hand and at the will of the operator of an automobile upon which the device is in use, jointly as follows: For its adjustment to different positions of the vehicle and likewise its simultaneous adjustment of the clearance gap between the two contacts and, or, also arresting the movement of said pendulum when no duty is required. Your applicant believes this to be a useful result that is novel and new.

To attain such result as outlined, it becomes necessary to devise, in combination with other parts specified herein, means to cause said device to remain in special positions within its range of movement to which the device may be regulated by, and released from, manual stress; and such retention of position is acquired in applicant's device by a tension means that retains said positions from which applicant's device is immovable by force of gravity of itself.

It is true that the difference in tensions intervening between the casing and its support, in case of applicant's device and other devices, is the proper amount of tension required, in relation to the amount of gravituous force of either casing, to perform the decidedly opposite functions. Neither specified tension will perform, on the device of the other, the result claimed.

This structure provided to easily create the required tension at will, and used in combination with elements specified, would appear to produce this new and useful result claimed by your applicant.

Another object of my invention is to provide a means, in theft signals to be used on automobiles, to produce the result of a positive sliding and rubbing engagement of the contact members therein upon the make and break of the circuit during activation of the device by vibration of an automobile to which the device may be attached, thereby preventing any electrical weld of the contact members upon contact of one with the other, and to produce a contact interval that has a duration of engagement greater than an ordinary touch and rebound. There is no device of the kind known to your applicant that is constructed to produce a definite rubbing engagement of the contacts. To attain this result in combination with a pendulum contact, your applicant provides a condensed spring that constitutes the fundamental or cardinal point on which a rigid arm integral therewith depends for its course or movement; said condensed spring supporting said arm obliquely toward, with the arm's terminal end near to, the said pendulum. When said arm's terminal contacts said pendulum stem, the point of said contact and the point of suspension of said pendulum and the condensed spring form a variable angle during an activated engagement of said contacts thereby changing the angle thus formed as the pendulum forces itself onto the said arm producing the rubbing contact.

Another object is to produce a casing that constitutes an economical item of neatness, compactness, ease of assembly, and of marketable appearance.

In order to more readily describe my invention, reference will be made to the accompanying drawing, in which like reference characters designate like parts throughout, and in which Fig. 1 is a front view, front wall removed.

Fig. 2 is a top view.

Fig. 3 is a sectional cut, front view.

Fig. 4 is a side view, cross section, along lines 4, 4 of Fig. 1.

Fig. 5 is a diagram of electrical wiring.

Referring to the drawing: 1 designates a casing of insulating or insulated material. 14 and 15 designate lead wires interposed into the circuit of the horn of an automobile. 2 designates a shaft athwart said casing 1, from which pendulum 3 is suspended for oscillating movement while the stem 5 thereof serves as an electrical contact means to engage terminal 6 of rigid arm 7 that is integral with spring 8. Spring 8 constitutes the fundamental or cardinal point on which rigid arm 7 depends for its course or result when moved under impact of stem 5 during activation of pendulum 3 by vibratory means. It will thus be observed that such impact will cause terminal 6 of rigid arm 7 to slide with a rubbing engagement along stem 5 as the lower portion of stem 5 during said engagement shortens its distance or lengthens its distance from spring 8 thus producing a contact of a duration equivalent to the to and fro engagement of the said parts 5 and 6, thereby permitting of a free flow of current and freeness from an electrical weld that would result in an unwanted continuous alarm.

Casing 1 is threaded at 9 onto screw support 10 having a shoulder 11 to engage casing 1 at 9 when casing 1 is turned homeward on screw support 10, also a tension spring 12 is intervened between shoulder 11 and casing 1, resulting in a device that may be turned by hand upon screw support 10 to easily create the desired tension necessary to adjust and retain the working gap between stem 5 and terminal 6. A greater turn of the device whereby the contacts 5 and 6 become separated, as shown in Fig. 3, will bring wall 13 of casing 1 into contact with pendulum 3 arresting pendulum 3 after having lifted terminal 6 and arm 7 away from the pendulum stem 5. This structure also serves as a self-contained switch and means by which the sensitiveness of the device may be easily adjusted instantly at the will of the operator of an automobile and from the operator's seat.

Having described my invention, I claim:

1. A tilting signal device comprising a casing, a pendulum hinged within said casing, a conductor wire electrically connected to said pendulum, whereby said pendulum constitutes a terminal of a switch, and a second terminal made of a single piece of wire and comprising a substantially straight rigid arm extending from a coil spring pivot and connected to a second conductor wire, said pendulum being adapted to engage the free end of said arm upon tilting the casing.

2. In combination, a member adapted to be attached to a tiltable support such as a vehicle, a screw on said member, a casing having screw threaded engagement with said screw, a pendulum within said casing pivoted about an axis parallel to said screw, a conductor wire attached to said pendulum, whereby said pendulum constitutes one terminal of a switch, and a second terminal for the switch made of a single piece of wire and comprising a rigid arm extending from a coil spring hinge, and said pendulum being adapted to engage the free end of said arm to swing said arm about the spring hinge and cause rubbing engagement between the pendulum and the free end of said arm when the vehicle is tilted, and a second conductor wire electrically connected to the pivoted arm.

3. In combination, a member adapted to be attached to a tiltable support such as a vehicle, a screw on said member, a casing having screw threaded engagement with said screw, a pendulum within said casing pivoted about an axis parallel to said screw, a conductor wire attached to said pendulum, whereby said pendulum constitutes one terminal of a switch, and a second terminal for the switch made of a single piece of wire and comprising a rigid arm extending from a coil spring hinge, and said pendulum being adapted to engage the free end of said arm to swing said arm about the spring hinge and cause rubbing engagement between the pendulum and the free end of said arm when the vehicle is tilted, and a second conductor wire electrically connected to the pivoted arm, said arm being normally disposed at an angle to the pendulum, and said casing being rotatable about said screw, to vary the distance between said pendulum and the free end of said arm, and a spring interposed between said member and the casing and disposed about said screw to retain the casing against accidental rotation about said screw in any angular position to which the casing is rotated on said screw.

4. In combination, a suction cup adapted to be attached to the dashboard of an automobile, a screw fixed to said suction cup, a casing having screw threaded engagement with said screw, a spring interposed between said suction cup and casing, a weighted pendulum pivoted at its upper end within said casing, a member made of spring wire fixed within said casing and comprising a torsion spring, and a substantially rigid arm extending from said torsion spring, said pendulum being adapted to engage the free end of said arm upon tilting the automobile.

5. A tilting signal device comprising a casing, a pendulum hinged within said casing, a conductor wire electrically connected to said pendulum, whereby said pendulum constitutes a terminal of a switch, and a second terminal made of a single piece of wire and comprising a substantially straight rigid arm extending from a coil spring pivot connected to a second conductor wire, said pendulum being adapted to engage the free end of said arm upon tilting the casing, said arm being inclined toward the pendulum, and the free end of said arm pointing away from the pivot of said pendulum.

HENRY C. PERSONS.